US006784959B2

(12) United States Patent
Noritake (10) Patent No.: US 6,784,959 B2
(45) Date of Patent: *Aug. 31, 2004

(54) REFLECTIVE LIQUID CRYSTAL DISPLAY (75) Inventor: Kazuto Noritake, Gifu (JP)

(73) Assignee: Sanyo Electric Co., Ltd. (JP)

( * ) Notice: Subject to any disclaimer, the term of this patent is extended or adjusted under 35 U.S.C. 154(b) by 17 days.

This patent is subject to a terminal disclaimer.

(21) Appl. No.: 10/388,865

(22) Filed: Mar. 14, 2003

(65) Prior Publication Data

US 2003/0160922 A1 Aug. 28, 2003

Related U.S. Application Data (63) Continuation of application No. 09/773,055, filed on Jan. 31, 2001, now Pat. No. 6,563,559.

(30) Foreign Application Priority Data

Feb. 2, 2000 (JP) .......................................... 2000-24647

(51) Int. Cl.⁷ ..................... G02F 1/1335; G02F 1/1333; G02F 1/1343
(52) U.S. Cl. ......................... 349/113; 349/84; 349/112; 349/138; 349/139
(58) Field of Search ................................ 349/112, 113, 349/138, 139, 116, 84, 122; 359/599, 627

(56) References Cited

U.S. PATENT DOCUMENTS

| | | | |
|---|---|---|---|
| 3,862,360 A | 1/1975 | Dill et al. | 178/7.38 |
| 4,239,346 A | 12/1980 | Lloyd | 349/44 |
| 4,431,272 A | 2/1984 | Yazawa et al. | 350/336 |
| 4,519,678 A | 5/1985 | Komatsubara et al. | 349/160 |
| 4,648,691 A | 3/1987 | Oguchi et al. | 350/338 |
| 5,327,268 A | 7/1994 | Takabatake et al. | 349/42 |
| 5,407,845 A | 4/1995 | Nasu et al. | 438/30 |
| 5,548,425 A | 8/1996 | Adachi et al. | 349/113 |
| 5,691,791 A | 11/1997 | Nakamura et al. | 349/113 |
| 5,793,457 A | 8/1998 | Tamai et al. | 349/156 |
| 5,796,455 A | 8/1998 | Mizobata et al. | 349/116 |

(List continued on next page.)

FOREIGN PATENT DOCUMENTS

| | | |
|---|---|---|
| EP | 0 112 417 | 7/1984 |
| EP | 0 883 015 | 12/1998 |
| EP | 0 886 169 | 12/1998 |
| EP | 0 996 026 | 4/2000 |
| JP | 57-49983 | 3/1982 |
| JP | 11-52402 | 6/1989 |
| JP | 6-230399 | 8/1994 |
| JP | 6-294954 | 10/1994 |
| JP | 7-318974 | 12/1995 |
| JP | 9-127553 | 5/1997 |
| JP | 9-179127 | 7/1997 |
| JP | 10-221704 | 8/1998 |
| JP | 11-183714 | 7/1999 |

OTHER PUBLICATIONS

Patent Abstracts of Japan, Hozumi Shigeo, Production of Light Control Plate, Japanese Patent No. 3–107901 Published May 8, 1991.

*Primary Examiner*—Tarifur R. Chowdhury
(74) *Attorney, Agent, or Firm*—Cantor Colburn LLP

(57) ABSTRACT

Between a substrate comprising reflective display electrodes each including a flat portion, a slope portion, and a base portion, and TFTs, and an opposing substrate on which a color filter and an opposing electrode is accumulated, and on the side of viewer, a light diffuser layer having the haze value of 33%, a retardation film, and a polarization film are provided, liquid crystal is disposed. The angle of inclination (angle of elevation) of the slope portion with regard to the base portion is greater than 0° and 8° or less. With this structure, it is possible to provide a reflective LCD capable of achieving increased luminance in each display pixel and of providing bright display over a wide range of viewing angles.

34 Claims, 6 Drawing Sheets

U.S. PATENT DOCUMENTS

| | | | |
|---|---|---|---|
| 5,805,252 A | 9/1998 | Shimada et al. | 349/138 |
| 5,847,789 A | 12/1998 | Nakamura et al. | 349/113 |
| 5,877,832 A | 3/1999 | Shimada | 349/143 |
| 5,880,797 A | 3/1999 | Yamada et al. | 349/84 |
| 5,946,065 A | 8/1999 | Tagusa et al. | 349/139 |
| 5,973,843 A | 10/1999 | Nakamura | 359/619 |
| 6,037,084 A | 3/2000 | Ting et al. | 349/107 |
| 6,061,111 A | 5/2000 | Kataoka et al. | 349/113 |
| 6,091,470 A | 7/2000 | Fujikawa et al. | 349/122 |
| 6,162,654 A | 12/2000 | Kawabe | 349/106 |
| 6,163,405 A | 12/2000 | Chang et al. | 359/599 |
| 6,172,728 B1 | 1/2001 | Hiraishi | 349/138 |
| 6,184,949 B1 | 2/2001 | Cornelissen et al. | 349/64 |
| 6,262,783 B1 | 7/2001 | Tsuda et al. | 349/111 |
| 6,300,152 B1 | 10/2001 | Kim | 438/30 |
| 6,313,898 B1 | 11/2001 | Numano et al. | 349/129 |
| 6,326,129 B1 | 12/2001 | Hirose et al. | 430/318 |
| 6,342,935 B1 | 1/2002 | Jang et al. | 349/113 |
| 6,348,960 B1 | 2/2002 | Etori et al. | 349/112 |
| 6,556,260 B1 * | 4/2003 | Itou et al. | 349/69 |

* cited by examiner

REFLECTIVE LIQUID CRYSTAL DISPLAY

CROSS REFERENCE TO RELATED APPLICATIONS

This application is a continuation application of U.S. Pat. No. 09/773,055, filed on Jan. 31, 2001, now U.S. Pat. No. 6,563,559 which is herein incorporated by reference in its entirety.

BACKGROUND OF THE INVENTION

1. Field of the Invention

The present invention relates to a reflective liquid crystal display (LCD) having a light diffuser.

2. Description of Related Art

Figure 1:
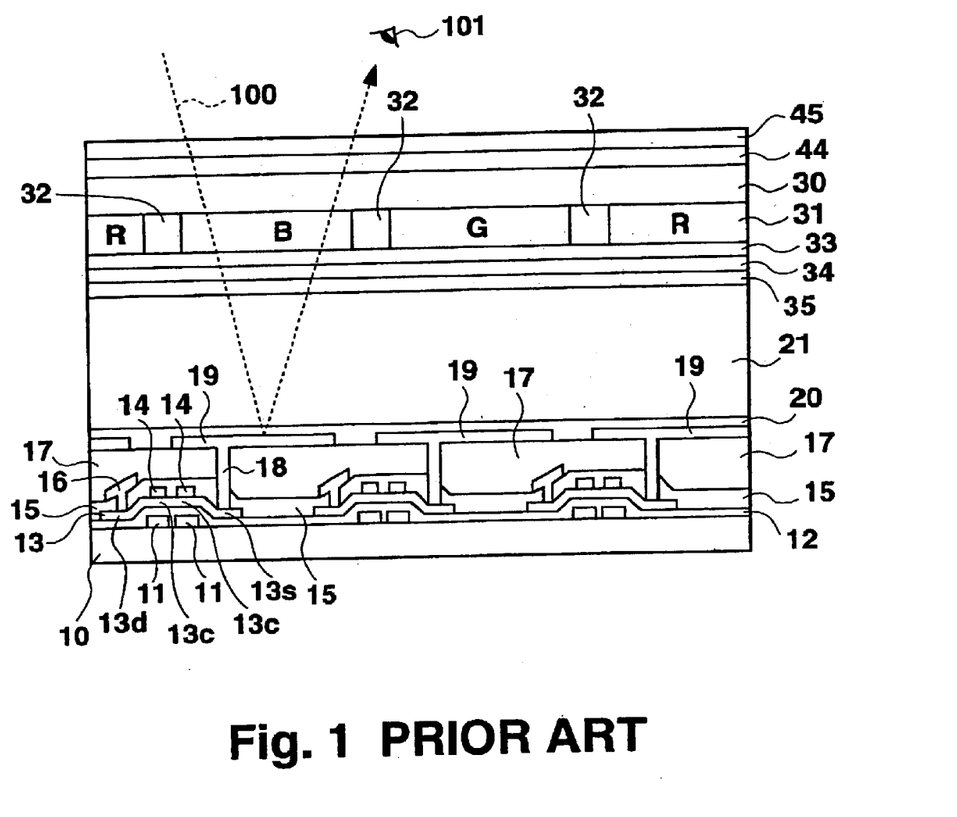
FIG. 1 is a cross sectional view of a related art reflective LCD.

Reflective LCDs, in which incident light from the viewer's direction is reflected for display, have been proposed. FIG. 1 is a cross sectional view of such a reflective LCD.

The reflective LCD shown in FIG. 1 comprises thin film transistors (hereinafter referred to as "TFTs"), which function as switching elements, on an insulating substrate 10 composed of a quartz glass, non-alkali glass or the like.

More specifically, on the insulating substrate (TFT substrate) 10, gate electrodes 11 comprising a refractory metal such as chromium (Cr) or molybdenum (Mo), a gate insulating film 12, and an active layer 13 comprising a polycrystalline silicon film are sequentially formed in that order.

In the active layer 13, channels 13c are formed at positions directly above the respective gate electrodes 11, and a source 13s and a drain 13d are formed at outer sides of the channels 13c by ion doping using stopper insulating films 14 above the respective channels 13c as a mask.

An interlayer insulating film 15, formed by accumulating an $SiO_2$ film, an SiN film and an $SiO_2$ in that order, is disposed over the entire surface covering the gate insulating film 12, the active layer 13 and the stopper insulating films 14. Then, a metal such as aluminum is used to fill a contact hole located corresponding to the drain 13d, thereby forming a drain electrode 16. A planarization insulating film 17 composed of an organic resin or the like is further disposed so as to cover the entire films located below for surface planarization. Another contact hole is formed in the planarization insulating film 17 at a position corresponding to the source 13s, and a reflective display electrode 19 composed of Al is formed on the planarization insulating film 17. The reflective display electrode 19 contacts with the source 13s via this contact hole and also serves as a source electrode 18. Then, an alignment film 20 composed of an organic resin such as polyimide for performing alignment of liquid crystal 21 is disposed on the reflective display electrode 19.

On an opposing electrode substrate 30 composed of an insulating substrate which faces the TFT substrate 10, at the side of the TFT substrate 10, a color filter 31 comprising red (R), green (G), and blue (B) filters and black matrixes 32 having light shielding function, a protecting film 33 composed of a resin, an opposing electrode 34, and an alignment film 35 are sequentially formed in that order. Further, on the other side of the opposing electrode substrate 30, a retardation film 44 and a polarization film 45 are disposed. The opposing electrode substrate 30 and the TFT substrate 10 are adhered to each other at the periphery using a sealing adhesive (not shown) to sandwich twisted nematic (TN) liquid crystal 21 in the gap formed therebetween.

The path light travels when the above-described reflective LCD is viewed will next be described.

Referring to FIG. 1, as indicated by the dotted line with an arrow, natural light 100 enters the device from the polarization film 45 provided at the side of an viewer 101, transmits sequentially through the retardation film 44, the opposing electrode substrate 30, the color filter 31, the protecting film 33, the opposing electrode 34, the alignment film 35, the TN liquid crystal 21, and the alignment film 20 on the TFT substrate 10, and is then reflected by the reflective display electrode 19. The reflected light then passes through these layers in the reverse order and direction, and is emitted out of the device from the polarization film 45 disposed on the opposing electrode substrate 30 to reach the eyes of the viewer 101.

Figure 2A:
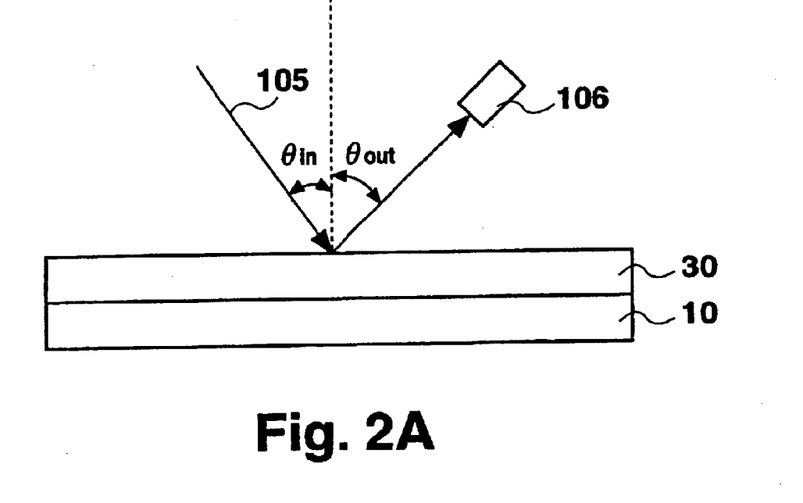
FIGS. 2A and 2B show a measurement method of reflected light in a reflective LCD and characteristics of reflected light in a display device such as that shown in FIG. 1.
Figure 2B:
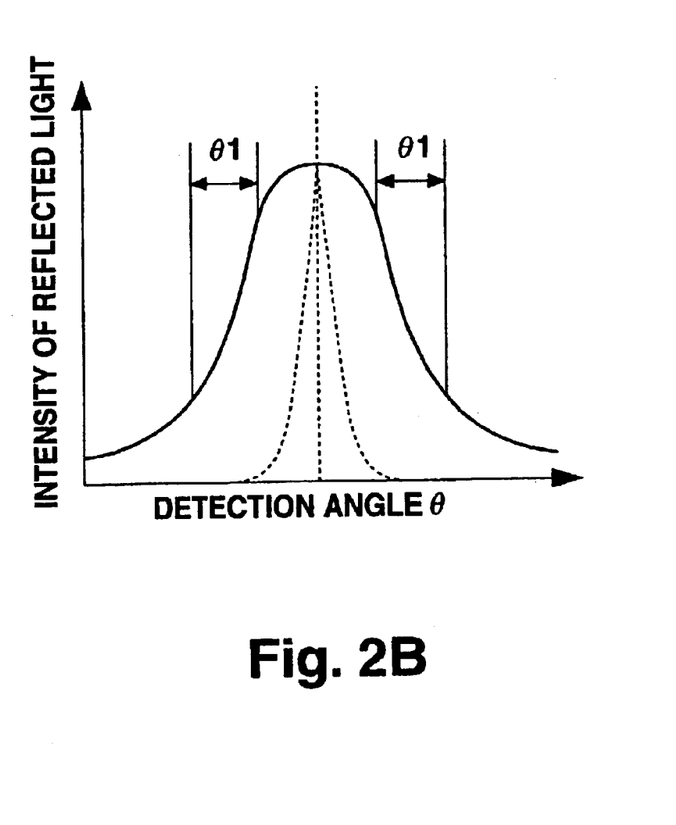

Referring now to FIGS. 2A and 2B, the luminance measurements of reflective light in a reflective LCD will be described.

FIG. 2A depicts a method for measuring luminance of a surface of a reflective LCD and FIG. 2B shows the measurement results.

As shown in FIG. 2A, a reflective LCD panel comprising a TFT substrate 10 and an opposing electrode substrate 30 is disposed with the display surface located above. Light entering the display panel is made to do so at a predetermined angle of inclination θin with respect to the normal direction of the display surface. This incident light 105 is reflected by a reflective display electrode. A light intensity detector 106 measures the reflected light emitted from the display panel at predetermined emission angles. More specifically, the light intensity detector 106 is moved to a position having an angle of θout with respect to the normal line (indicated by dotted line) of the LCD panel of FIG. 2A to detect the reflected light at the angle θout for intensity measurements.

The measurement results are shown in FIG. 2B by dotted lines. In FIG. 2B, the horizontal axis indicates a detection angle of reflected light and the vertical axis indicates the intensity of reflected light at respective detection angles.

However, as indicated by the dotted lines in FIG. 2B, a reflective LCD of the type described above is disadvantageous in that high intensity light is only reflected at certain detection angles, such that over a wide range of the display panel, bright display cannot be achieved.

In order to overcome this disadvantage, providing a light diffuser between the protecting film 33 and the opposing electrode 34 on the opposing electrode substrate 30 has been considered.

The relationship between the emission angle and the intensity of reflected light when the light diffuser is provided is also shown in FIG. 2B by a solid line. As shown, compared with the results shown by the dotted line, light with intensity can be obtained over a wider variety of angles, in other words, over a wider range, and bright display can be achieved when the light diffuser is provided.

However, at an angular range of θ1 in FIG. 2B, the intensity of reflected light becomes low, and brightness of the display changes abruptly. This causes non-uniformity of brightness when the viewer changes the viewing angle from the normal direction to the horizontal direction. Thus, these proposed reflective LCDs still can not overcome the disadvantage that brightness of display is not uniform and depends on the viewing angle.

SUMMARY OF THE INVENTION

The present invention was made in view of the foregoing disadvantages of the related art, and aims to provide a reflective liquid crystal display (LCD) capable of achieving uniformly bright display with increased luminance for each display pixel.

In accordance with one aspect of the present invention, there is provided a reflective liquid crystal display device, comprising liquid crystal provided in a gap between first and second substrates disposed facing each other, and electrodes for driving the liquid crystal each provided on the first and second substrates at the side opposing the liquid crystal, wherein, of said electrodes, an electrode formed on one of said first and second substrates is a reflective display electrode composed of a conductive reflective material, said reflective display electrode includes, at least on a surface opposing the liquid crystal, a concave portion depressed toward said first substrate in each pixel region, and said concave portion includes a base portion and a slope portion inclined toward said base portion.

In accordance with another aspect of the present invention, in the above reflective liquid crystal display device, said reflective display electrode is formed on an insulating film having a portion concave toward said first substrate.

In accordance with still another aspect of the present invention, in the above reflective liquid crystal display device, said reflective display electrode is formed on an insulating film having a portion concave toward said first substrate, over a switching element formed for each pixel.

In accordance with further aspect of the present invention, in the above reflective liquid crystal display device, said first or second substrate is provided with a light diffuser.

In accordance with yet another aspect of the present invention, in the above reflective liquid crystal display device, the extent of diffusion of said light diffuser has the haze value of between 19% and 70%.

In accordance with further aspect of the present invention, in the above reflective liquid crystal display device, the angle of elevation of said slope portion with respect to said base portion is greater than 0° and 8° or less.

As described above, in each pixel region, the reflective display electrode includes the slope portion in addition to the flat base portion, to thereby provide surfaces oriented at different angles with respect to the incident light. It is therefore possible to reflect the incident light in an effective range without loss to thereby achieve bright display with high contrast. For example, by setting the angle of elevation of the slope portion as described above, the incident light can be reflected within a very effective range of emission angle.

Further, by providing the light diffuser, the light which is effectively reflected by the above-mentioned reflective display electrode can be uniformly emitted toward the viewer. In addition, when a light diffuser with optimal characteristics according to the size of the display, for example, is employed, a bright image free from display non-uniformity (luminance non-uniformity) can be obtained in various display devices of different screen sizes.

As described above, according to the present invention, it is possible to provide a reflective LCD capable of achieving increased luminance in each display pixel and of providing bright display over a wide range of viewing angles.

BRIEF DESCRIPTION OF THE DRAWINGS

These and other objects of the invention will be explained in the description below, in connection with the accompanying drawings, in which.

DETAILED DESCRIPTION OF THE PREFERRED EMBODIMENT

A reflective LCD according to a preferred embodiment of the present invention will be described with reference to the accompanying drawings.

Figure 3:
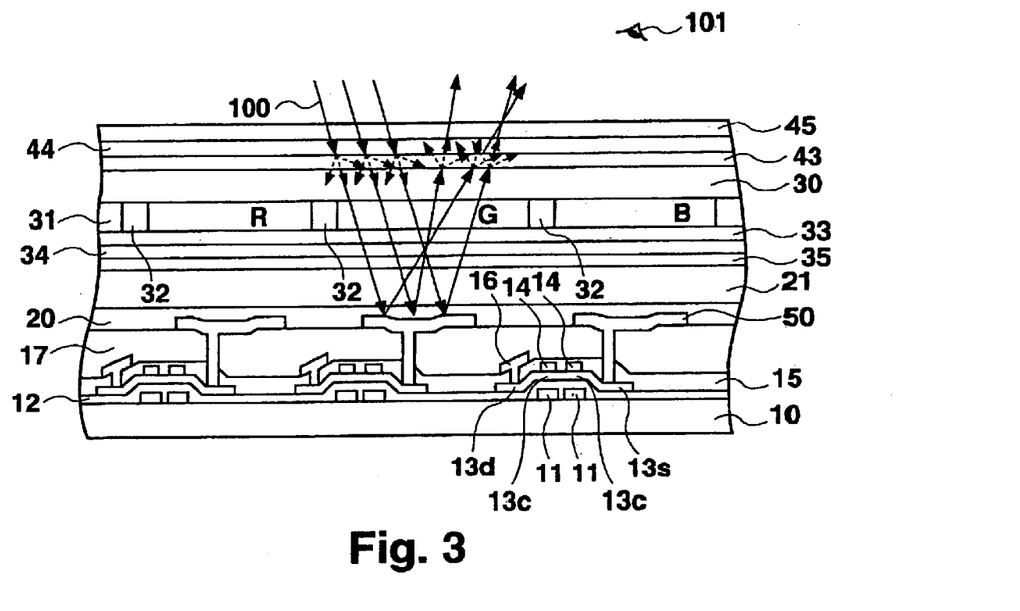
FIG. 3 is a cross sectional view of a reflective LCD according to an embodiment of the present invention.

FIG. 3 is a cross sectional view of a reflective LCD according to the present invention.

As shown in FIG. 3, according to the device of this embodiment, TFTs serving as switching elements are formed on an insulating substrate 10 composed of quartz glass and non-alkali glass.

On the insulating substrate 10, various films from gate electrodes 11 composed of a refractory metal such as Cr and Mo through a planarization insulating film 17 are formed in the same manner as has been described above with regard to the related art structure. A method of manufacturing the device after formation of the planarization insulating film 17, which differs from the method described above, will be described.

Over the planarization insulating film 17, reflective display electrodes 50 each composed of a conductive reflective material such as Al and Ag (silver) and connected to the source 13s of the active layer 13 composed of polycrystalline silicon film are formed. The reflective display electrode 50 has a concave portion which is depressed toward the TFT substrate 10 at substantially the center thereof. An alignment film 20 composed of polyimide or the like is further disposed on the reflective display electrodes 50 for alignment of liquid crystal.

The other substrate, being the opposing electrode substrate 30, is provided, on the side where the liquid crystal 21 is provided, with a color filter 31 having each of RGB colors and black matrixes 32 with light shielding function, and a protecting film 33 composed of an acrylic resin or the like for protecting the color filter 31. Over the entire surface of the protecting film 33, an opposing electrode 34 facing respective reflective display electrodes 50 is formed. Further, an alignment film 35 composed of polyimide is disposed on the whole surface of the opposing electrode 34.

On the side of the opposing electrode substrate 30 where the liquid crystal is not provided, namely on the side of a viewer 101, a light diffuser 43 for diffusing light, a (λ/4) retardation film 44 and a polarization film 45 are sequentially formed in that order from the side of the substrate 30. TN liquid crystal may be used for the liquid crystal 21.

The path of light when viewing the thus configured reflective LCD will be described.

As indicated in FIG. 3 by solid lines with arrow, natural light 100 enters the device through the polarization film 45 disposed at the side of the viewer 101, transmits through the retardation film 44 and reaches the light diffuser 43. The light diffused by the light diffuser 43 passes through the opposing electrode substrate 30, the color filter 31, the protecting film 33, the opposing electrode 34, the alignment film 35, the liquid crystal 21, and the alignment film 20 formed on the TFT substrate 10, to reach the reflective display electrode 50 which is composed of a reflective material and includes a concave portion, where the light is reflected.

The configuration of the reflective display electrode 50 will next be described.

Figure 4:
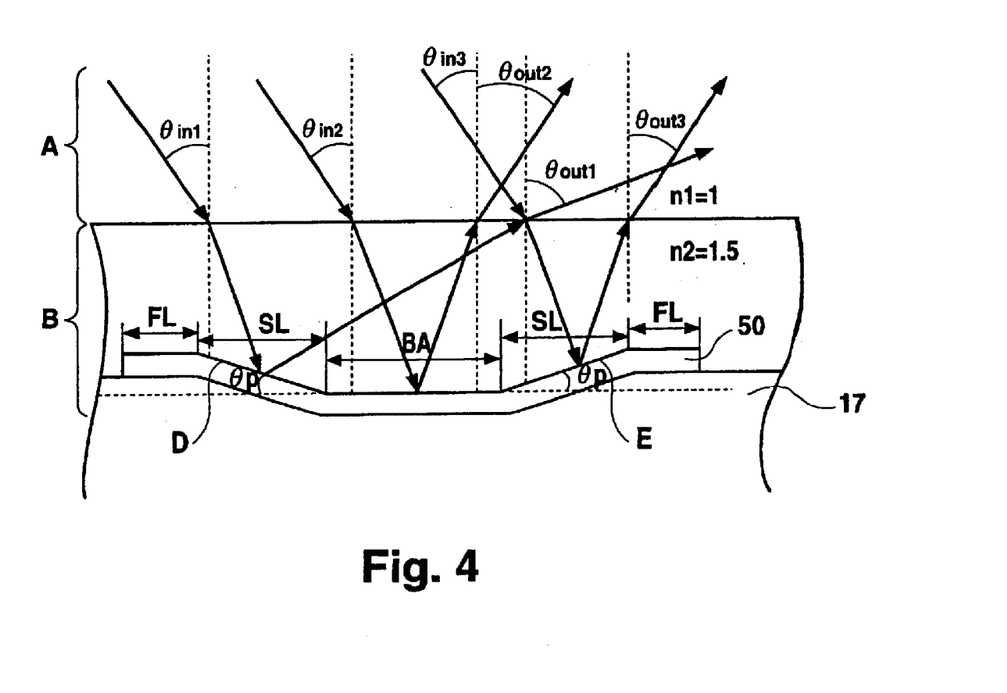
FIG. 4 is an enlarged view of a reflective display electrode of the reflective LCD according to the present invention.
Figure 5:
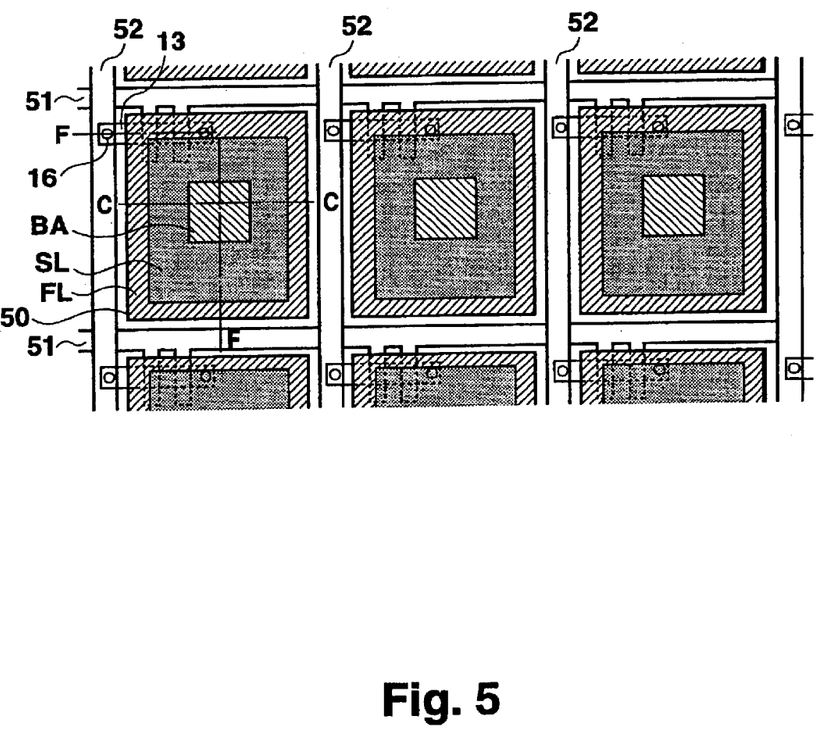
FIG. 5 is a plan view of the reflective LCD on the TFT substrate side according to the present invention.

FIG. 4 is an enlarged view of the reflective display electrode of FIG. 3, in which path of the incident light and the emission light is shown. FIG. 5 is a plan view of the reflective LCD of the present invention on the side of the TFT substrate. FIG. 4 is an enlarged cross sectional view taken along line C—C of FIG. 5.

The reflective display electrode 50 is composed of a metal with high reflectance such as Al and Ag, as described, and has at least one concave portion depressed toward the substrate 10. As shown in FIG. 4, each concave portion of the reflective display electrode 50, in its cross section, is formed by a peripheral flat portion FL, a slope portion which is continuous from the flat portion and inclined toward the center of the reflective display electrode, and a base portion BA at substantially the center thereof, or at substantially the center of the reflection display electrode when only one concave portion is formed in each display electrode. The base portion BA is continuous from the slope portion SL (D or E). The inclination angle of the slope portion SL is an angle of elevation θp with respect to the surface of the base portion BA of the reflective display electrode 50.

Referring to FIG. 5, inside the quadrangular flat portion FL hatched by diagonal lines extending from upper right to lower left, the hatched slope portion SL which is continuous of the flat portion FL is formed. Further, the rectangular base portion BA hatched by diagonal lines extending from upper left to lower right is formed inside the slope portion SL.

The reflective display electrode 50 is thus formed by the flat portion FL, the slope portion SL and the base portion BA.

In FIG. 4, a region B is a region in the display panel up to the polarization film 45, namely a region of the display panel where, on the reflective display electrode 50, the alignment film 20, the liquid crystal 21 disposed directly thereon, and various layers through the polarization film 45 shown in FIG. 3 are formed. A region A, on the other hand, is on the outside of the display panel (atmosphere), namely an exposed region on the side of the viewer 101.

The path of the light entering the slope portion SL and the base portion BA will next be described.

The angle θout (emission angle), at which the light which enters the display panel through air and is then reflected by the reflective display electrode 50 goes out in air, is expressed by the following expressions (1) and (2).

$$\theta_{out} = \sin^{-1}\left[\frac{n_2}{n_1}\sin\left\{\sin^{-1}\left(\frac{n_1}{n_2}\cdot\sin\theta_{in}\right) + 2\theta_p\right\}\right] \quad (1)$$

$$\theta_{out} = \sin^{-1}\left[\frac{n_2}{n_1}\sin\left\{\sin^{-1}\left(\frac{n_1}{n_2}\cdot\sin\theta_{in}\right) - 2\theta_p\right\}\right] \quad (2)$$

where $n_1$ is a refractive index in air, that is $n_1=1$, and $n_2$ is a refractive index within the display panel, that is $n_2 \approx 1.5$.

First, the light which enters the slope portion D at the left side of FIG. 4 will be described. The light comes through air into the display panel at an angle of θin1, advances according to the above expression (1), is reflected by the slope portion D, and is emitted from the display panel in air at an angle of θout1. At this time, the relation of θout1>θin1 is satisfied.

Next, the light which enters the base portion BA will be described. Light from outside enters the display panel at an angle of θin2, advances according to the above expression (1) or (2), is reflected by the base portion BA, and is emitted from the display panel in air at an angle of θout2. At this time, the relation of θout2=θin2 is satisfied.

Then, the light which enters the slope portion E at right side of FIG. 4 will be described. External light enters the display panel at an angle of θin3, advances according to the above expression (2), is reflected by the slope portion E, and is emitted from the display panel in air at an angle of θout3. At this time, the relation of θout3<θin3 is satisfied.

The incident light is thus reflected at various portions of the reflective display electrode, and is then emitted from the display panel.

The method for forming the reflective display electrode comprising a flat portion, a slope portion, and a base portion will be described.

FIGS. 6A through 6E are cross sectional views taken along line F—F of FIG. 5 and show the manufacturing processes of the reflective LCD of the present invention.

Figure 6A:
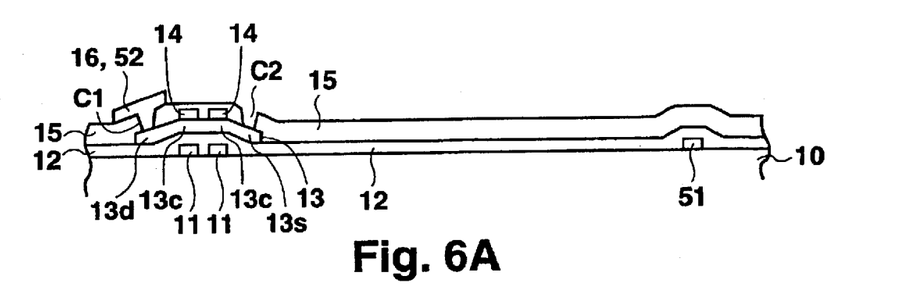
FIGS. 6A, 6B, 6C, 6D, and 6E are views showing manufacturing processes of the reflective LCD according to the present invention.
Figure 6B:
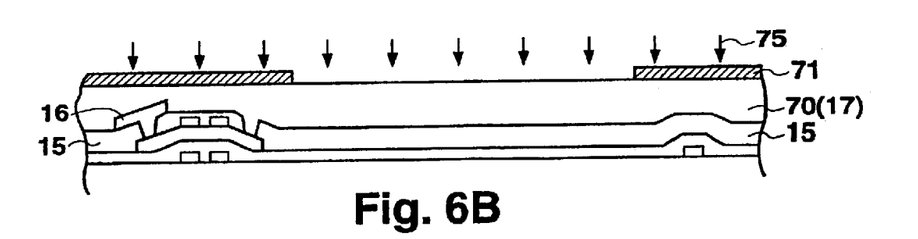
Figure 6C:
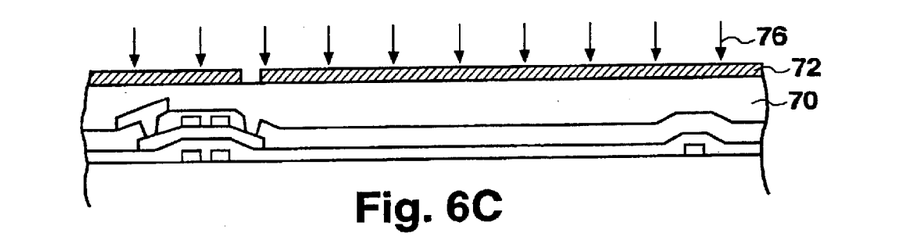
Figure 6D:
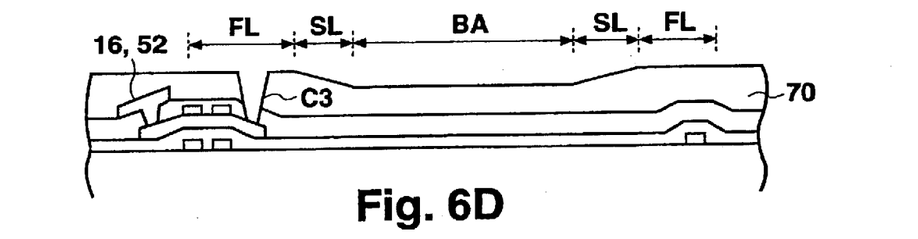

As shown in FIG. 6D, at an intersection formed by a gate signal line 51 partially comprising the gate electrodes 11 and a drain signal line 52 partially comprising the drain electrode 16, a TFT contacting with the reflective display electrode 50 composed of a reflective material is provided. The reflective display electrode 50 is formed so as to extend over the TFT. The flat portion FL, the slope portion SL, and the base portion BA are formed on the surface of the reflective display electrode 50.

Process 1 (FIG. 6A):

On an insulating substrate 10 composed of a quartz glass, a non-alkali glass, or the like, the gate electrodes 11 composed of a refractory metal such as Cr and Mo and forming a part of the gate signal line 51, a gate insulating film 12 comprising an SiN film and an SiO$_2$ film, and an active layer 13 composed of a poly-crystalline silicon film, are sequentially formed in that order.

In the active layer 13, channels 13c are each formed above the gate electrode 11, and a source 13s and a drain 13d are formed by doping ions at both outer sides of the channels 13c.

Above each channel 13c, a stopper insulating film 14 composed of an SiO$_2$ film is provided as a mask covering the channel 13c so as to prevent ions from entering the channel when ions are doped for forming the source 13s and the drain 13d.

Over the entire surface covering the gate insulating film 12, the active layer 13, and the stopper insulating films 14, an interlayer insulating film 15, formed by sequential accumulation of an SiO$_2$ film, an SiN film and an SiO$_2$ film, is provided. The interlayer insulating film 15 may comprise a single film composed of SiO, SiN or an organic material such as acryl or the like, or a multi-layered film composed of any combination of these materials.

In the interlayer insulating film 15, contact holes C1 and C2 are provided at positions corresponding to the drain 13d and the source 13s, respectively. A single metal of Al or a lamination of Mo and Al fills the contact hole C1 to form a drain electrode 16.

The drain signal line 52 is formed on the interlayer insulating film 15 simultaneously with the formation of the drain electrode 16 which forms part of the drain signal line 52.

Process 2 (FIG. 6B)

On the entire surface covering the interlayer insulating film 15 including the contact hole C2, the drain signal line 52, and the drain electrode 16, a photosensitive resin film 70 with photosensitivity and surface planarity, which is composed of an insulating resin, is applied. Then, a first mask 71 having an opening at a region corresponding to the slope portion SL and the base portion BA of the reflective display electrode 50 to be formed later, is provided on the photosensitive resin film 70, and first exposure 75 is performed. At this time, the amount of exposure is sufficient as long as the exposure light reaches the region near the surface of the photosensitive resin 70, and may be 20~60 mJ, preferably 25~50 mJ, more preferably 30~40 mJ.

Process 3 (FIG. 6C):

The first mask 71 is then replaced with a second mask 72 which has an opening at a position corresponding to a contact hole C3, which will be formed for making the source 13s of the active layer 13 and the reflective display electrode 50 contact with each other.

With the second mask 72 provided, second exposure 76 is performed. The amount of exposure in the second exposure 76 is set to be greater than that in the first exposure because the depth of the contact hole C3 is deeper than that of the base portion BA, and the amount of exposure in the second exposure 76 must be great such that the exposure light reaches a sufficient depth for allowing the contact hole C3 to reach the source 13s. More specifically, the exposure amount in the second exposure 76 is 200~600 mJ, preferably 250~500 mJ, and more preferably 300~400 mJ.

Either the concave portion formed with the flat portion FL, the slope portion SL, and the base portion BA, or the contact hole C3 may be formed first, as long as the exposure amount for forming the contact hole C3 is greater than that for forming the concavity.

Process 4 (FIG. 6D):

After the second mask 72 is removed, the photosensitive resin film 70 is developed so that it is etched to form the base portion BA, the slope portion SL and the contact hole C3.

Figure 6E:
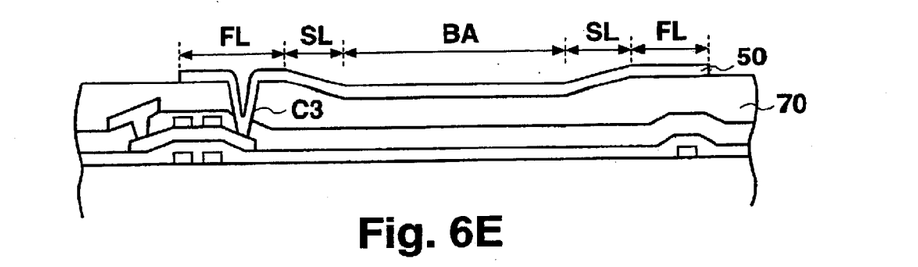

Process 5: (FIG. 6E):

The reflective display electrode 50 composed of a reflective material such as Al is then formed in a predetermined pattern on the formed region. In this manner, the reflective display electrode 50 having the flat portion FL, the base portion BA, and the slope portion SL on the surface is provided.

An alignment film for achieving alignment of the liquid crystal is further disposed on the reflective display electrode 50 to thereby complete the TFT substrate. An opposing electrode substrate is then disposed so as to face the TFT substrate. On the opposing electrode substrate, an opposing electrode and an alignment film are disposed on the side where the liquid crystal is provided, and a retardation film and a polarization film are disposed on the side where the liquid crystal is not provided. The TFT substrate and the opposing electrode substrate are adhered to each other at the periphery, and the liquid crystal is provided in the gap between the substrates to thereby complete the reflective LCD.

Next, the light diffuser for diffusing light will be described.

Figure 7:
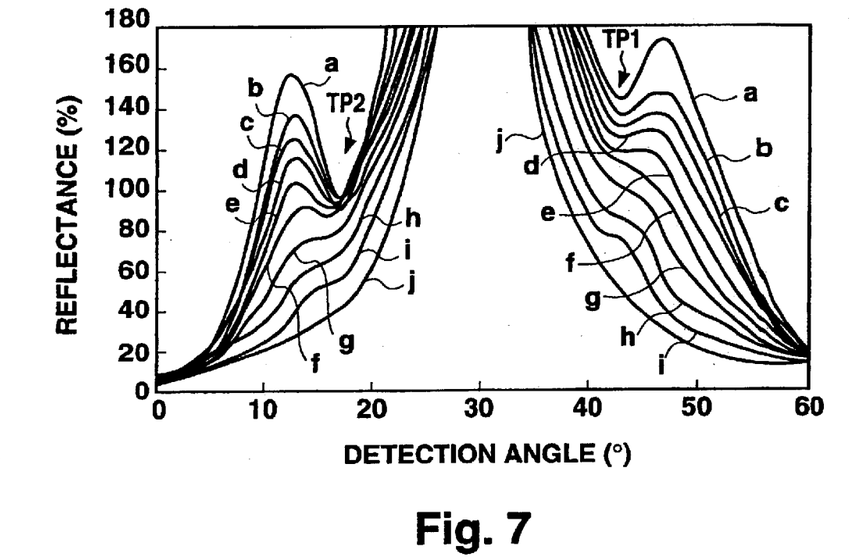
FIG. 7 is a diagram showing a relation between reflectance and emission light peak angle of the reflective LCD according to the present invention.

FIG. 7 shows a relationship between the detection angle of reflected light and the reflectance when the reflective display electrode 50 having a concave portion as described above is employed in a structure having a light diffuser 43 formed on the opposing electrode substrate 30 on the side of the viewer 101, as shown in FIG. 3. Here, the reflectance refers to a rate of the measured brightness of reflected light of the reflective LCD divided by the brightness of reflected light in a standard light diffuser, and therefore may exceed 100%. In FIG. 7, the horizontal axis indicates the detection angle of the reflected light when the normal direction of the display surface is set to be 0°, while the horizontal axis indicates the reflectance at respective detection angles.

As shown in FIG. 7, each curve indicating the relation between detection angle and reflectance has different haze value for a light diffuser. More specifically, the curves b, c, d, e, f, g, h, i, and j represent the light diffusers with the haze values of 7%, 14%, 19%, 25%, 33%, 45%, 55%, 70%, and 75%, respectively. The curve a represents the case where a light diffuser is not provided. In the examples shown in FIG. 7, the light enters the display panel through the region A at an incident angle θin of 30°.

In FIG. 7, all the curves indicate the maximum peak of the amount of reflected light in the vicinity of the detection angle of 30°, and include bump-shaped protrusions at the detection angles around 12°~15° and around 45°~47°, respectively. At these convex portions, a large amount of reflected light is emitted due to reflection by the slope portion SL of the reflective display electrode 50, as will be described later, so that bright display is obtained.

Now, the vicinity of the detection angle 45° along the curve a which represents a case where a light diffuser is not provided is examined. The reflectance is decreased around the detection angle 30° through 42°(TP1), and is then increased gradually at around 42° to reach another peak at around the detection angle of 47°. Namely, by forming the reflective surface of the reflective display electrode 50 as shown in FIG. 4, bright display can be achieved also at detection angles other than near 30° where the amount of reflected light is maximum in FIG. 7. After that, the reflectance is gradually decreased. The reflectance is thus increased or decreased depending on the detection angle. However, when the amount of reflected light varies significantly depending on the angle at which a viewer sees the reflective LCD, display with non-uniform brightness is observed.

To cope with the this problem, it is preferable to provide a light diffuser as in the reflective LCD according to the present invention. When a light diffuser is provided, compared to the case where no light diffuser is provided, the extent of the protrusion of the bump portions in the vicinity of the detection angles 15° and 45°. is lowered as shown in the curves b~j, so that non-uniformity of the amount of reflected light is reduced (a possibility of reversal of the amount of reflected light is lowered), thereby making possible a uniformly bright display.

It is preferable, from the viewpoint of reducing non-uniformity of brightness, that reflectance at around the detection angle of 47° not be reversed from the reflectance at around the detection angle of 40°. Specifically, contrary to the case of the curve a where the reflectance starts increasing again at the point TP1, in the cases of curves d, e, f, g, h, and i, the reflectance decreases from the peak in the vicinity of the detection angle of 30° and does not exceed the reflectance at the point TP1 with the detection angles increasing above that in the point TP1. It is therefore preferable to use a light diffuser capable of achieving such reflectance characteristics. More specifically, when a light diffuser with haze value of 19% or greater and 70% or less is employed, it is possible to suppress the partial reversal phenomenon of the amount of reflected light, which occurs when the reflectance exceeds the point TP1 in the vicinity of the maximum peak in the amount of reflected light with no light diffuser provided, thereby achieving uniformly bright display in the reflective LCD.

Similarly, it is also preferable that the light diffuser to achieve the characteristics that the reflectance not be reversed significantly at a point TP2 in the vicinity of the detection angle of 12°~15°. In other words, the haze value of the light diffuser may preferably be 19% or greater and 70% or less, as represented by the curves d, e, f, g, h, and I in FIG. 7, and more preferably be 30% or greater and 55% or less.

As used in the present specification, "haze value" is determined based on a transparency evaluation criterion ASTMD1008, and is measured according to the following principle.

A measuring system is used in which a light source, a sample, and an integrating sphere are aligned on a straight optical path, and a detector for measuring diffused light is provided at a portion of the integrating sphere.

A light ray emitted from the light source passes through a sample to be measured (which is a light diffuser in the case of the present invention) to enter the integrating sphere. The incident light is uniformly diffused inside the integrating sphere provided with a white and non-glossy coating, and is measured by the detector.

The haze value represents the extent of diffusion of light entering the light diffuser, and is expressed as a percentage of incident light having an average angle of 2.5° or greater.

Next, the angle of inclination of the slope portion SL of the reflective display electrode will be described.

Figure 8:
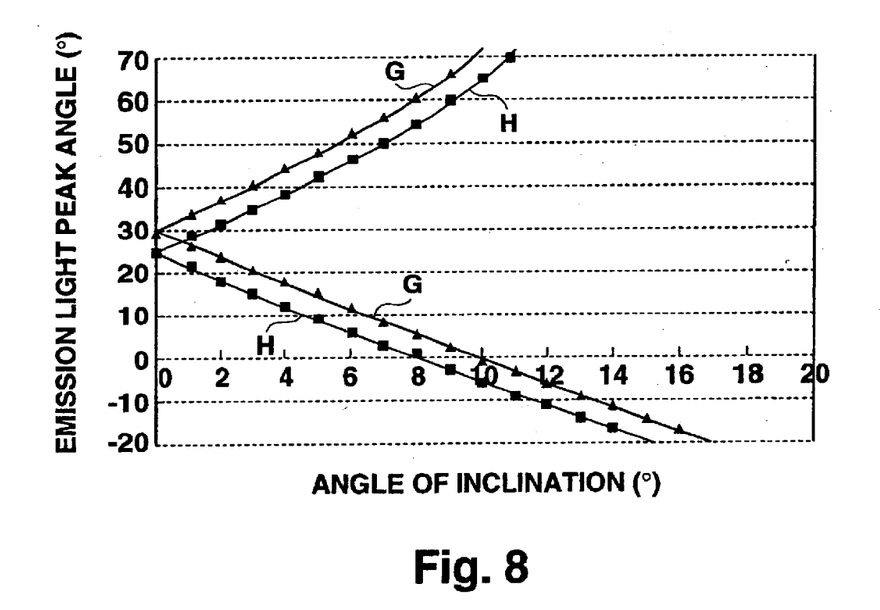
FIG. 8 is a diagram showing a relationship between emission light peak angle and inclination angle of the slope portion of the reflective display electrode in the reflective LCD of the present invention.

FIG. 8 depicts a relationship between the inclination angle of the slope portion SL of the reflective display electrode and the peak angle of the reflected light. The horizontal axis indicates the inclination angle of the slope portion of the reflective display electrode and the vertical axis indicates the peak angle of the reflected light emitted through the panel. The inclination angle of the slope portion of the reflective display electrode refers to an angle of elevation with respect to the surface of the base portion of the reflective display electrode. The peak angle of the emission light refers to an angle at which the light entering the reflective LCD is reflected and emitted through the LCD with the highest reflectance.

In FIG. 8, the curve G indicates a case where the incident angle of the light entering the reflective LCD with respect to the reference (0°) in the normal direction of the display surface of the display device is 30° and the curve H indicates the case where such an incident angle is 25°.

With regard to the curve G, for example, the emission light peak angles greater than 30° are obtained from the slope surface D at the left of the reflective display electrode of FIG. 4 and the emission light peak angles smaller than 30° are obtained from the slope surface E at the right of the reflective display electrode of FIG. 4.

It is very likely that a viewer will view the reflective LCD at an angle range of approximately 0°~60° with respect to the normal line of the display surface.

Accordingly, it is appropriate that the emission light peak angle is set to this range of approximately 0°~60° in FIG. 8. For this angle setting, the inclination angle of the slope portion SL of the reflective display electrode should preferably be approximately greater than 0° and 8° or less. It is thus possible to set the peak of the emission light to between 0° and 60°. Further, as will be described in the following, it is more preferable that the inclination angle of the slope portion SL is set to between 4° and 6°.

Referring back to FIG. 7 which shows an example when the incident angle θin=30°, the "bump-shaped" protrusions appear at the detection angles near 12°~15° and near 45°~47°. When such bumps appear in the vicinity of 15°, which is a middle angle between 0° and 30°, and in the vicinity of 45°, which is a center angle between 30° and 60°, non-uniformity of brightness is not noticeable and bright display can be obtained on the display panel at an angle range of 0°~60°. In particular, by adding the light diffuser 43 as described above, bright display can be obtained in the vicinity of detection angles 12°~15 and 45°~47° as well as at near 30° in the example of FIG. 7, and reverse of the amount of reflected light at the above-mentioned protrusions can be suppressed, so that non-uniformity of luminance can be eliminated.

Therefore, in order to achieve the peak in the emission light at around 15° and 45°, it is preferable that the inclination angle is set to 4°~6° in FIG. 8.

As described above, a light diffuser is provided in the reflective LCD, in which the haze value representing the extent of light diffusion is determined, so that non-uniformity of brightness is not caused when the LCD is viewed at various angles. Therefore, a display device achieving uniform brightness can be obtained.

In the foregoing embodiment, the light diffuser 43 is provided on the opposing electrode substrate 30 on the side of the viewer 101 which is opposite to the side where the color filter 31 is provided. However, the present invention is not limited to the above structure, and the similar effects can also be obtained when the light diffuser 43 is provided between the surface of the opposing electrode substrate 30 and the color filter 31, between the protecting film 33 and the opposing electrode 34, or between the reflective display electrode 50 and the alignment film 20, or when the light diffuser is substituted for the protecting film 33 and is provided between the color filter 1 and the opposing electrode 34.

Also, while in the embodiment as described above the reflective display electrode includes the flat portion in the periphery, the present invention is not limited to that structure. Similar effects can also be obtained when the reflective display electrode includes only the slope portion and the flat base portion which is continuous from the slope portion, and does not include the peripheral flat portion.

Further, while in the above description a concave portion is formed in the photosensitive resin film 70 which is located under the reflective display electrode 50 so as to form the slope, flat, and base portions of the reflective display electrode 50, the present invention is not limited to that structure, and it is also possible to selectively etch the surface of the reflective display electrode 50 which is formed on a flat film 70.

The behavior of the liquid crystal 21 in an example device according to the preferred embodiment will next be described. When no voltage is applied to the liquid crystal, the incident light from outside of the device is linearly polarized by the polarization film 45 and is further polarized circularly by the retardation film 44 before entering the liquid crystal 21. The light, which is then reflected by the reflective display electrode 50 and changes the phase by λ/2, passes through the liquid crystal 21 again, further changes the phase by λ/4 by the retardation film 44, and is the shielded by the polarization film 45 so that it is seen as black color.

When a voltage is applied to the liquid crystal, the light incident from outside of the device is linearly polarized by the polarization film 45 and is further polarized circularly by the retardation film 44 before entering the liquid crystal 21. The light is then reflected by the reflective display electrode 50 and changes the phase by λ/2, and passes through the liquid crystal 21 again. At this point, the light is elliptically polarized, which further changes the phase by λ/4 by the retardation film 44, and is linearly polarized by the polarization film 45 so that it is seen as white color.

In the foregoing embodiment, polycrystalline silicon is used in the active layer of the TFT. However, the present invention is not limited to the example, and the advantages of the present invention can also be obtained when an amorphous silicon semiconductor material is used. Also, the reflective display electrode having the above-described structure can be applied not only to the active matrix type LCD in which a switching element is provided in each pixel, but also to the passive matrix type reflective LCD with or without the light diffuser, and the above-described advantages of the present invention can still be achieved.

In addition, although a bottom gate type TFT in which the gate electrodes are located under the active layer is described in the description of the preferred embodiment, the present invention is not limited to such an example, and the advantage of the present invention can also be achieved with a top gate type TFT in which the gate electrodes are provided over the active layer.

Further, a conductive reflective material such as silver may be used in place of Al as a material for the reflective display electrode.

With the present invention, it is possible to provide a reflective LCD capable of achieving increased luminance in each display pixel and of providing bright display over a wide range of viewing angle.

While the preferred embodiment of the present invention has been described using specific terms, such description is for illustrative purposes only, and it is to be understood that changes and variations may be made without departing from the spirit or scope of the appended claims.

What is claimed is:

1. A reflective liquid crystal display device, comprising:
   liquid crystal provided in a gap between first and second substrates disposed facing each other, said first and second substrates are glass substrates; and
   electrodes for driving the liquid crystal for each pixel, which is provided on each of the first and second substrates at the side opposing the liquid crystal,
   wherein, of said electrodes, an electrode formed on said first substrate is a reflective display electrode composed of a conductive reflective material,
   said reflective display electrode includes, for each pixel, a first flat portion on an upper portion, a second flat portion on a base portion, and a slope portion,
   wherein said second flat portion and said slope portion form a concave portion depressed toward said first substrate on a surface opposing the liquid crystal.

2. The reflective liquid crystal display device according to claim 1, wherein said reflective display electrode is formed on an insulating film having a portion concave toward said first substrate.

3. The reflective liquid crystal display device according to claim 1, wherein said first or second substrate is provided with a light diffuser.

4. The reflective liquid crystal display device according to claim 3, wherein the extent of diffusion of said light diffuser has a haze value of between 19% and 70%.

5. The reflective liquid crystal display device according to claim 1, wherein said slope portion extends in a direction toward said first flat portion.

6. A reflective liquid crystal display device, comprising:
   liquid crystal provided in a gap between first and second substrates disposed facing each other, said first and second substrates are glass substrates; and
   electrodes for driving the liquid crystal for each pixel, which is provided on each of the first and second substrates at the side opposing the liquid crystal,
   wherein, of said electrodes, an electrode formed on said first substrate is a reflective display electrode composed of a conductive reflective material,
   said reflective display electrode is formed on an insulating film having a portion concave toward said first substrate, over a switching element formed for each pixel,
   said reflective display electrode includes, for each pixel, a first flat portion on an upper portion, a second flat portion on a base portion, and a slope portion,
   wherein said second flat portion and said slope portion form a concave portion depressed from the surface opposing the liquid crystal toward said first substrate.

7. The reflective liquid crystal display device according to claim 6, wherein said first or second substrate is provided with a light diffuser.

8. The reflective liquid crystal display device according to claim 7, wherein the extent of diffusion of said light diffuser has a haze value of between 19% and 70%.

9. The reflective liquid crystal display device according to claim 6, wherein said slope portion extends in a direction toward said first flat portion.

10. A reflective liquid crystal display device, comprising:
    liquid crystal provided in a gap between first and second substrates disposed facing each other, said first and second substrates are glass substrates; and
    electrodes for driving the liquid crystal for each pixel, which is provided on each of the first and second substrates at the side opposing the liquid crystal,
    wherein, of said electrodes, an electrode formed on said first substrate is a reflective display electrode composed of a conductive reflective material,
    said reflective display electrode includes, for each pixel, a concave portion depressed toward said first substrate on a surface opposing the liquid crystal,
    said concave portion includes a base portion and a slope portion inclined toward said base portion, and
    said slope portion extends in an opposite direction toward a flat portion.

11. The reflective liquid crystal display device according to claim 10, wherein said reflective display electrode is formed on an insulating film having a portion concave toward said first substrate.

12. The reflective liquid crystal display device according to claim 10, wherein said first or second substrate is provided with a light diffuser.

13. The reflective liquid crystal display device according to claim 12, wherein the extent of diffusion of said light diffuser has a haze value of between 19% and 70%.

14. The reflective liquid crystal display device according to claim 10, wherein said slope portion is planar.

15. The reflective liquid crystal display device according to claim 10, further comprising said reflective display electrode includes, for each pixel, said first flat portion on an upper portion and a second flat portion on said base portion.

16. A reflective liquid crystal display device, comprising:
liquid crystal provided in a gap between first and second substrates disposed facing each other, said first and second substrates are glass substrates; and
electrodes for driving the liquid crystal for each pixel, which is provided on each of the first and second substrates at the side opposing the liquid crystal,
wherein, of said electrodes, an electrode formed on said first substrate is a reflective display electrode composed of a conductive reflective material,
said reflective display electrode is formed on an insulating film having a portion concave toward said first substrate, over a switching element formed for each pixel,
said reflective display electrode includes, for each pixel, a concave portion depressed from the surface opposing the liquid crystal toward said first substrate,
said concave portion includes a base portion and a slope portion inclined toward said base portion, and
said slope portion extends in an opposite direction toward a first flat portion.

17. The reflective liquid crystal display device according to claim 16, wherein said first or second substrate is provided with a light diffuser.

18. The reflective liquid crystal display device according to 17, wherein the extent of diffusion of said light diffuser has a haze value of between 19% and 70%.

19. The reflective liquid crystal display device according to claim 16, wherein said slope portion is planar.

20. The reflective liquid crystal display device according to claim 16, further comprising said reflective display electrode includes, for each pixel, said first flat portion on an upper portion and a second flat portion on said base portion.

21. A reflective liquid crystal display device, comprising:
liquid crystal provided in a gap between first and second substrates disposed facing each other, said first and second substrates are glass substrates; and
electrodes for driving the liquid crystal for each pixel, which is provided on each of the first and second substrates at the side opposing the liquid crystal,
wherein, of said electrodes, an electrode formed on said first substrate is a reflective display electrode composed of a conductive reflective material,
said reflective display electrode includes, for each pixel, a concave portion depressed toward said first substrate on a surface opposing the liquid crystal,
said concave portion includes a base portion and a slope portion inclined toward said base portion, and
wherein an angle of elevation of said slope portion with respect to said base portion is greater than 0° and 8° or less.

22. The reflective liquid crystal display device according to claim 21, wherein said reflective display electrode is formed on an insulating film having a portion concave toward said first substrate.

23. The reflective liquid crystal display device according to claim 21, wherein said first or second substrate is provided with a light diffuser.

24. The reflective liquid crystal display device according to 23, wherein the extent of diffusion of said light diffuser has a haze value of between 19% and 70%.

25. A reflective liquid crystal display device, comprising:
liquid crystal provided in a gap between first and second substrates disposed facing each other, said first and second substrates are glass substrates; and
electrodes for driving the liquid crystal for each pixel, which is provided on each of the first and second substrates at the side opposing the liquid crystal,
wherein, of said electrodes, an electrode formed on said first substrate is a reflective display electrode composed of a conductive reflective material,
said reflective display electrode is formed on an insulating film having a portion concave toward said first substrate, over a switching element formed for each pixel,
said reflective display electrode includes, for each pixel, a concave portion depressed from the surface opposing the liquid crystal toward said first substrate,
said concave portion includes a base portion and a slope portion inclined toward said base portion, and
wherein an angle of elevation of said slope portion with respect to said base portion is greater than 0° and 8° or less.

26. The reflective liquid crystal display device according to claim 25, wherein said first or second substrate is provided with a light diffuser.

27. The reflective liquid crystal display device according to 26, wherein the extent of diffusion of said light diffuser has a haze value of between 19% and 70%.

28. A reflective liquid crystal display device, comprising:
liquid crystal provided in a gap between first and second substrates disposed facing each other, said first and second substrates are glass substrates; and
electrodes for driving the liquid crystal for each pixel, which is provided on each of the first and second substrates at the side opposing the liquid crystal,
wherein, of said electrodes, an electrode formed on said first substrate is a reflective display electrode composed of a conductive reflective material,
said reflective display electrode includes, for each pixel, a concave portion depressed toward said first substrate on a surface opposing the liquid crystal, and
said reflective display electrode is shaped so as to have only a continuous slope portion and a base portion.

29. The reflective liquid crystal display device according to claim 28, wherein said reflective display electrode is formed on an insulating film having a portion concave toward said first substrate.

30. The reflective liquid crystal display device according to claim 28, wherein said first or second substrate is provided with a light diffuser.

31. The reflective liquid crystal display device according to 30, wherein the extent of diffusion of said light diffuser has a haze value of between 19% and 70%.

32. A reflective liquid crystal display device, comprising:
liquid crystal provided in a gap between first and second substrates disposed facing each other, said first and second substrates are glass substrates; and
electrodes for driving the liquid crystal for each pixel, which is provided on each of the first and second substrates at the side opposing the liquid crystal,
wherein, of said electrodes, an electrode formed on said first substrate is a reflective display electrode composed of a conductive reflective material, said reflective display electrode is formed on an insulating film having a portion concave toward said first substrate, over a switching element formed for each pixel, said reflective display electrode includes, for each pixel, a concave portion depressed from the surface opposing the liquid crystal toward said first substrate, and said reflective display electrode is shaped so as to have only a continuous slope portion and a base portion.

33. The reflective liquid crystal display device according to claim 32, wherein said first or second substrate is provided with a light diffuser.

34. The reflective liquid crystal display device according to 33, wherein the extent of diffusion of said light diffuser has a haze value of between 19% and 70%.

* * * * *